Figure 1:
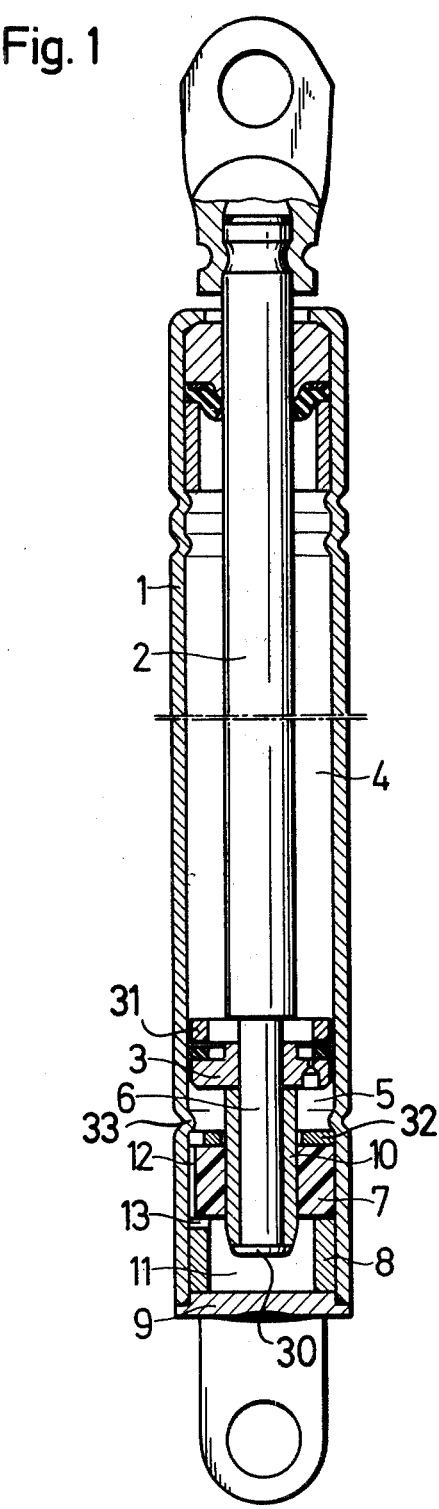

United States Patent [19]

Freitag et al.

[11] 4,166,612
[45] Sep. 4, 1979

[54] GAS SPRING WITH MEANS FOR IMPEDING PISTON MOVEMENT AWAY FROM ONE TERMINAL POSITION

[75] Inventors: Herbert Freitag, Koblenz-Metternich; Klaus Schnitzius, Rheinbrohl, both of Fed. Rep. of Germany

[73] Assignee: Stabilus GmbH, Koblenz-Neuendorf, Fed. Rep. of Germany

[21] Appl. No.: 791,011

[22] Filed: Apr. 26, 1977

[30] Foreign Application Priority Data

Apr. 30, 1976 [DE] Fed. Rep. of Germany ....... 2619176

[51] Int. Cl.² ............................................. F16F 9/48
[52] U.S. Cl. .................. 267/65 R; 188/284; 188/300; 267/120
[58] Field of Search ................ 267/8 R, 64 R, 65 R, 267/113, 118, 120, 124; 188/271, 282, 284, 300; 16/52, 66, 84

[56] References Cited

U.S. PATENT DOCUMENTS

| 3,147,966 | 9/1964 | Axthammer et al. | 267/64 R |
|---|---|---|---|
| 3,407,909 | 10/1968 | Seckerson et al. | 188/300 |
| 4,045,008 | 8/1977 | Bauer | 267/65 R |

FOREIGN PATENT DOCUMENTS

| 1015327 | 9/1957 | Fed. Rep. of Germany | 188/284 |
|---|---|---|---|
| 1920059 | 10/1970 | Fed. Rep. of Germany | 267/64 R |

*Primary Examiner*—Edward R. Kazenske
*Attorney, Agent, or Firm*—Brumbaugh, Graves, Donohue & Raymond

[57] ABSTRACT

The piston in a gas spring of the piston-and-cylinder type is prevented from moving from one of its terminal positions under the pressure of the gas in the cylinder by a plunger on the piston projecting toward the closed cylinder end and received in an axial recess of a brake member on the cylinder by cooperating engagement elements on the plunger and brake member which may provide a friction fit or impede fluid flow into the recess.

7 Claims, 6 Drawing Figures

U.S. Patent  Sep. 4, 1979  Sheet 1 of 3  4,166,612

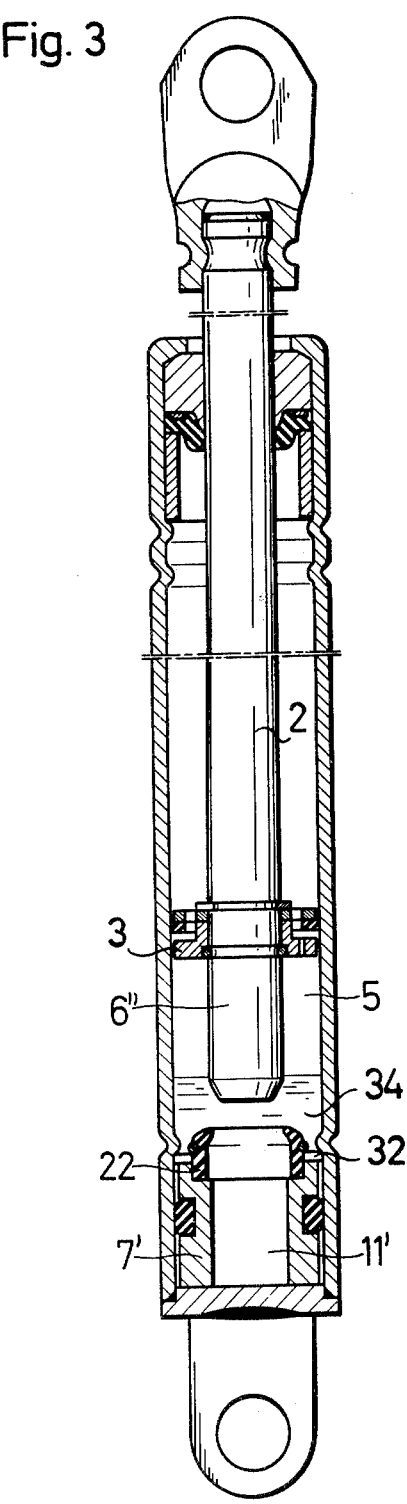
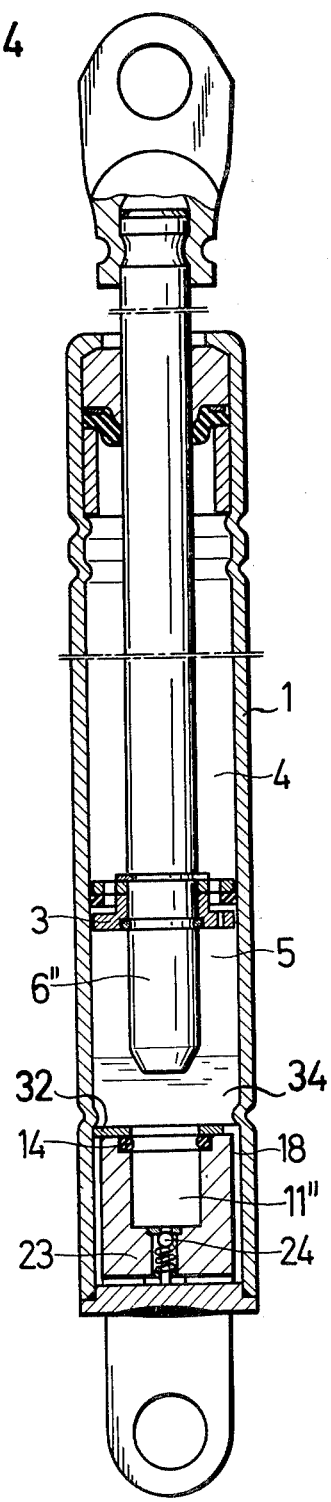

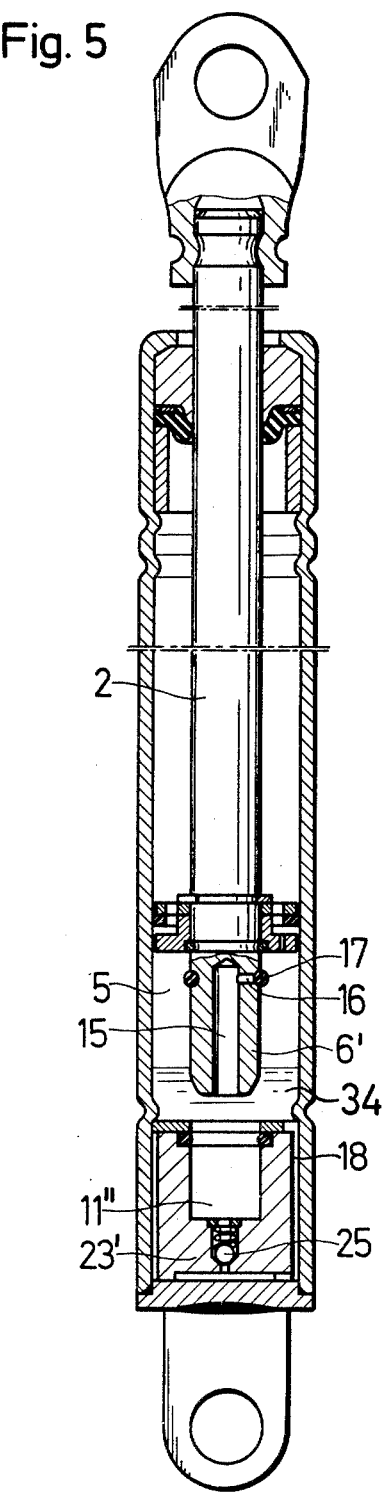
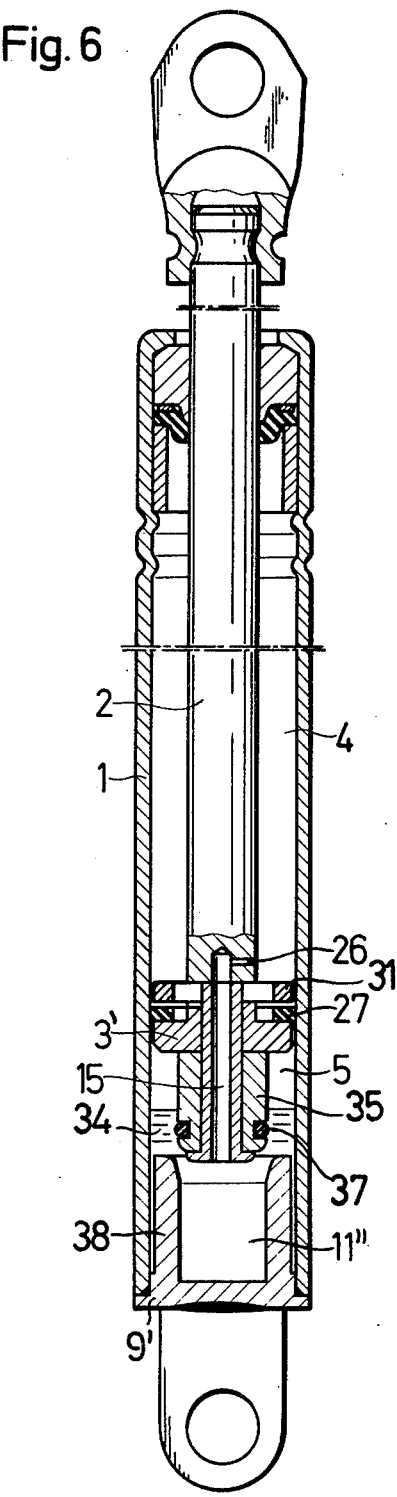

GAS SPRING WITH MEANS FOR IMPEDING PISTON MOVEMENT AWAY FROM ONE TERMINAL POSITION

This invention relates to gas springs, and particularly to an improved gas spring of the piston-and-cylinder type in which the piston rod is retained in the innermost position of its stroke against the pressure of a fluid in the cylinder tending to expel the piston rod.

Gas springs of the type described are employed between the body of a motor car or like vehicle and a cover, such as a hood, trunk lid, or door, mounted on the body for movement about a horizontal axis. The fluid pressure in the spring tends to move the piston in a direction to expel the piston rod and thereby to move the cover in an upward direction, whereby less or no manual effort is needed for lifting the cover. For downward movement of the cover, only the difference between the forces exerted by gravity and by the gas in the spring need to be overcome by hand. It is known to equip such gas springs with devices which impede movement of the piston rod from one of its axially terminal positions and thereby to hold the cover in a lowermost angular position against the force of the gas in the spring independently of a latch or lock securing the cover directly to the vehicle body.

The improved gas spring of this invention provides a brake arrangement for controlling axial movement of the piston into and away from one of its axially terminal positions which includes a plunger fastened to the piston for joint movement and a brake member secured to the cylinder and formed with an axially open recess which receives the plunger in the one terminal piston position. Cooperating elements on the plunger and brake member impede relative axial movement of the plunger and brake member when the plunger is received in the recess.

Other features, additional objects, and many of the attendant advantages of this invention will readily be appreciated as the same becomes better understood by reference to the following detailed description of preferred embodiments when considered in connection with the appended drawing in which:

FIG. 1 shows a gas spring of the invention in elevational section on its axis; and FIGS. 2 to 6 illustrate modifications of the spring of FIG. 1.

The spring illustrated in FIG. 1 is of conventional external appearance. It has a cylinder 1 and a piston rod 2 extending axially outward of the cylinder through a seal and an annular, radial end wall of the cylinder, the other end wall 9 of the cylinder being imperforate. The spring may be mounted between a vehicle body and a cover by means of fastening eyes on the piston rod 2 and cylinder wall 9. A piston 3 axially divides the cavity of the cylinder 1 into compartments 4, 5 respectively remote from and adjacent the end wall 9. The piston 3 is of the type disclosed in Schnitzius U.S. Pat. No. 3,919,509 to provide controlled communication between the compartments 4, 5 through a restricted passage. Air or nitrogen at superatmospheric pressure is confined in the cylinder cavity and tends to expel the piston rod 2 at a velocity controlled by the rate of gas flow from the compartment 4 into the compartment 5. The structure described so far and its operation are too well known to require more detailed description.

According to the invention, the piston rod 2 has a reduced inner end portion 6 which passes through the piston 3 and extends from the same into the compartment 5. The head 30 of a screw mounted in an axial bore of the rod portion 6 axially secures a tubular sleeve 10 on the piston rod portion 6, and the sleeve in turn axially clamps the piston 3 and an associated ring 31 to the shoulder between the reduced portion 6 and the main portion of the piston rod 2. The ring 31 is mounted on the rod portion 6 in a known manner by means of a spider, not shown.

A cylindrical brake block 7 is axially fastened in the cylinder compartment 5 between a washer 32 backed by an internal annular rib 33 of the cylinder 1 and a tubular spacer 8 which abuttingly engages the cylinder wall 9. The block 7 consists of somewhat resilient plastic and has a central, cylindrical, axial recess or passage whose cross sectional area in the relaxed condition of the block 7 is slightly smaller than the corresponding cross-sectional area of the plunger constituted by the piston rod part 6 and the sleeve 10 which is received in the recess or passage in the illustrated axially terminal position of the piston rod 2 and piston 3 in the cylinder cavity.

The brake block 7 separates a part 11 of the compartment 5 from another part nearer the piston 3 which is axially bounded by the piston and the washer 32. The two parts are connected by a throttling conduit partly constituted by an axially elongated notch 12 in the outer circumference of the block 7 and an aligned notch in the washer 32, the notches being sealed in a radially outward direction by the axial wall of the cylinder 1. A radial notch 13 in an end face of the spacer 8 is bounded by the block 7 and connects the part 11 of the compartment 5 to the notch 12.

As illustrated in FIG. 1, the gas spring is at or near its minimum overall length, and the piston rod 2 is at or contiguously adjacent its innermost axial position in the cylinder 1, the inward stroke of the piston rod 2 being determined in part by the vehicle elements attached to the piston rod and to the end wall 9 respectively. Friction between the compressed face portion of the block 7 and the sleeve 10 provides the braking force needed to retain the piston rod 2 in the illustrated position, but can be overcome manually, and fluid may enter the compartment part 11 through the notches 12, 13. Fluid may leave the part 11 through the same conduit when the conically tapering end of the plunger 6, 10 enters the recess or passage in the block 7 and radially compresses the material of the block.

Depending on specific requirements, the unitary block 7 may be replaced by a metal ring and a resilient, apertured plug in the ring. The illustrated dual plunger structure permits the choice of different materials of construction for the piston rod 2 and the element 10 on the piston rod which frictionally engages the brake body 7, but a unitary plunger may be mounted on a piston suitably fastened to the piston rod 2 as will be described with reference to FIGS. 2 to 5.

Figure 2:
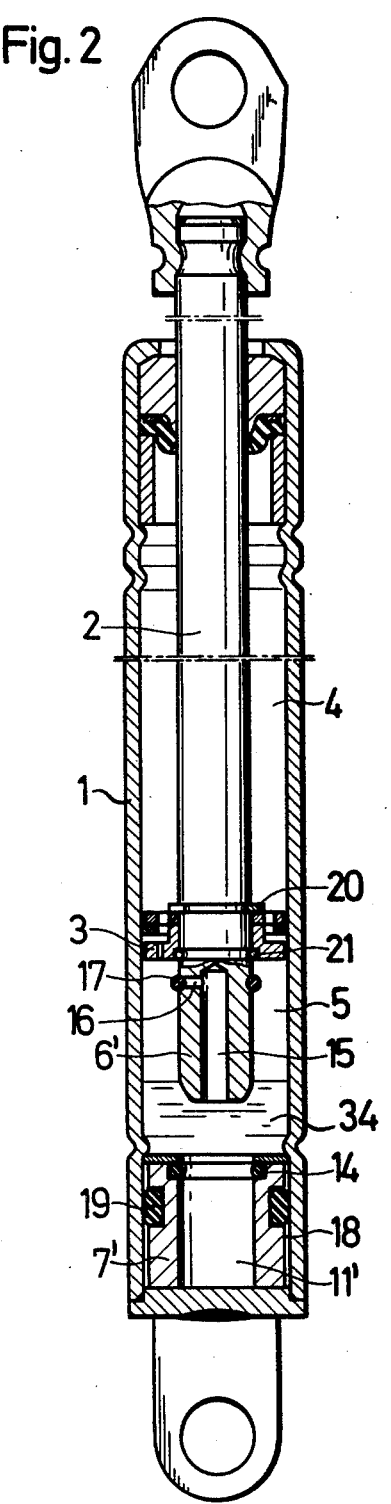

The external appearance of the gas spring shown in FIG. 2 is not significantly different from that of the spring described with reference to FIG. 1, and the piston 3 is the full functional equivalent of the corresponding element shown in FIG. 1. It is secured to the piston rod 2 by two spring clips 20, 21. A plunger portion 6' of the piston rod 2 projects axially from the piston 3 into the compartment 5 and has the same circular cross section as the main portion of the piston rod in the compartment 4. An axial bore 15 of the plunger portion 6' is open toward a metallic brake block 7' secured in the closed bottom end of the cylinder 1 by a washer and an internal rib of the cylinder. The diameter of the block 7' is smaller than that of the inner cylinder wall to provide an annular clearance gap 18 sealed by a resilient ring 19 partly recessed in the block 7'. A central recess or passage 11' in the block 7' is dimensioned to receive the plunger portion 6' without significant friction which is further reduced by a body of oil 34 which partly fills the compartment 5 including all of the recess 11' in all operative positions of the suitably mounted spring.

A resilient O-ring 14 in the orifice of the recess 11' is dimensioned to be compressed by the plunger portion 6' during downward movement of the piston rod 2 from the illustrated position. Oil may leave the recess through the bore 15 and a connecting radial bore 16 in the plunger portion 6' closely adjacent the piston 3. A split ring 17 of spring metal normally obstructs the outer orifice of the radial bore 16, but yields under the pressure of the outwardly flowing oil 34. The one-way valve constituted by the ring 17 prevents or severely limits inward oil flow even when the pressure of compressed gas in the cylinder cavity is otherwise strong enough to overcome the weight of an attached cover, and the resulting hydraulic brake action keeps the piston rod 2 in its non-illustrated lowermost position. The O-ring 14 is readily selected to permit leakage of oil into the recess 11' when manually applied force aids the axially outward movement of the piston rod 2, and such leakage may be enhanced by slight radial displacement of the block 7' against the centering restraint of the ring 19.

The gas spring illustrated in FIG. 3 differs from that described with reference to FIG. 2 by an integral plunger portion 6" of the piston rod 2 which lacks an axial bore, and by a sealing element 22 which replaces the O-ring 14. The element 22 is a short tube of elastomeric material partly recessed in the brake block 7' and partly projecting from the recess 11' in an axial direction. The projecting portion of the element 22 tapers conically toward the piston 3 and terminates in a thin, annular lip which engages the axial face of the plunger portion 6" when the latter moves downward from the illustrated position. The element 22 acts as a one-way valve which readily spreads to permit flow of oil 34 from the recess 11' into the part of the compartment 5 near the piston 3 when the plunger portion 6" enters the recess 11' while resisting inward flow of oil into the recess 11' with sufficient force to brake the piston rod 2 to a standstill unless the plunger portion 6" is retracted from the recess 11' by force manually applied to the piston rod 2.

The plunger portion 6" on the piston 3 of the spring shown in FIG. 4 is identical with the corresponding element described with reference to FIG. 3. It cooperates with a cup-shaped brake block 23 which is secured in the cylinder 1 by a notched washer 32, and whose recess 11" is dimensioned for practically frictionless introduction of the plunger portion 6", an O-ring 14 sealing the introduced plunger portion 6" to the brake block 23. A one-way valve 24 in the bottom of the cup shape includes a spherical valve member spring-biased toward the closing position, but yielding to oil 34 flowing out of the recess 11" into grooves in the bottom wall of the brake block 23 which communicate with a clearance gap 18 between the block 23 and the axial cylinder wall. The notch in the washer 32 connects the gap 18 to the part of the compartment 5 adjacent the piston 3.

When the plunger 6" travels downward from the illustrated position, the pressure in the recess 11" exceeds that in the remainder of the cylinder cavity sufficiently so that the one-way valve 24 is opened against the restraint of its spring and oil is released from the recess. Only a small amount of oil is left in the recess 11", the valve 24, and the gap 18 when the plunger 6" reaches its lowermost position, and the valve 24 is closed by its spring. The oil trapped in the recess 11" does not exert significant expelling force on the plunger 6", and the higher gas pressure in other parts of the cylinder cavity does not exert effective axial forces on the plunger portion 6" nor on any element connected thereto for joint movement. The plunger portion 6" may be retracted manually from the recess 11", and oil thereafter may enter the partly evacuated space relinquished by the plunger portion.

The brake block 23' illustrated in FIG. 5 is similar to the block 23 shown in FIG. 4, but is equipped with a one-way valve 25 in its bottom which permits the entry of oil through the clearance gap 18 from the part of the cylinder compartment 5 near the piston 3 under a pressure differential sufficient to overcome the valve spring. The brake block 23' cooperates with a plunger portion 6' of the piston rod 2 which is substantially identical with the correspondingly referenced element in FIG. 2. Fluid under higher pressure may be released from the recess of the brake block 23' through the bores 15, 16 of the plunger portion 6' while the plunger portion is sealingly received in the recess 11".

The resilient elements of the two one-way valves 17, 25 are readily chosen to produce a desired hydraulic braking effect. When the spring in the valve 25 is strong enough, it keeps the valve closed when the plunger portion 6' is received in the recess 11', but yields to manual traction on the piston rod 2 which reduces the pressure in the recess.

The piston 3' illustrated in FIG. 6 differs from the pistons in all other illustrated embodiments of the invention by lacking a permanently open passage between the compartments 4,5. As is known in itself, a piston ring 27 on the piston 3' prevents axial fluid flow through a clearance gap between the piston 3' and the cylinder 1 during outward movement of the piston rod 2 in the manner shown in the drawing. The piston ring 27 is axially movable a small distance between positions of axial, sealing engagement with the body of the piston 3' and the spider-mounted ring 31, and is moved between these positions by the frictional drag of the stationary cylinder 1, also initially by oil flow, while the piston 3' moves axially.

In the illustrated position of the piston 3', and during movement of the piston with the piston rod 2 outward of the cylinder cavity, the only passage connecting the compartments 4, 5 is formed by the axial bore 15 of a plunger assembly constituted by coaxially engaged tubular elements 35, 36 whose combined, circular cross section is greater than that of the piston rod 2' and by a narrow radial bore 26 in the piston rod 2' connected with the bore 15. The piston 3' and the plunger assembly 35, 36 are attached fixedly to the inner axial end of the piston rod 2' in a conventional manner, not shown. An O-ring 37 partly projects from the plunger element 35 near the free end of the plunger assembly, and the piston ring 27 is mounted by its non-illustrated spider on the other end of the element 36.

The radial bottom wall 9' of the cylinder 1 has an integral, tubular axial extension 38 in the compartment 5 which bounds a recess 11" open toward the piston 3' through a flaring orifice and functions as a brake block in the manner described above. The recess 11" is dimensioned for sealing engagement by the O-ring 37 during downward movement of the plunger assembly 35, 36 from the illustrated position.

During such movement, oil 34 flows from the recess 11" through the bores 15, 26 into the compartment 4, and oil simultaneously flows along the cylinder wall and the central apertures of the rings 27, 31 from the compartment 5 into the compartment 4, the piston ring 27 assuming its non-illustrated axial position adjacent the ring 31 during downward piston movement because of the frictional drag exerted by the cylinder wall and by the oil.

When the piston rod 2 reaches its innermost position during manual closing of the non-illustrated, attached cover, the pressure of the compressed gas in the compartment 4 is still transmitted briefly to the liquid almost completely filling the several parts of the contracted compartment 5 and causes the piston rod 2 to move outward of the cylinder 1 over a negligibly small distance corresponding to the axial clearance of the piston ring 27 between the body of the piston 3' and the ring 31.

The one-way valve constituted by the piston ring 27 then moves into the position shown in FIG. 6 and interrupts communication between the portion of the compartment 5 near the piston 3' and the compartment 4. Full gas pressure thereafter is applied only to the liquid in the recess 11" and cannot overcome the opposite gas pressure acting on the top surfaces of the piston. After the minimal reverse movement mentioned above, the plunger assembly 35, 36 and the extension 38, acting as a brake block, prevent outward movement of the piston rod 2 in the absence of a manually applied force.

It should be understood, of course, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A gas spring comprising:
   (a) a cylinder having an axis and defining a sealed cavity therein;
   (b) a piston axially movable in said cavity between two axially terminal positions and axially dividing said cavity into two compartments,
      (1) said compartments communicating through a passage at least in a position of said piston intermediate said terminal positions;
   (c) fluid under superatmospheric pressure in said cavity;
   (d) a piston rod fastened to said piston for joint axial movement therewith, said piston rod extending axially from said piston through one of said compartments and outward of said cavity; and
   (e) brake means for controlling axial movement of said piston into and out of one of said terminal positions thereof, said brake means including,
      (1) a plunger member fastened to said piston for joint movement therewith and axially projecting from the piston into the other compartment, said plunger member being formed with a bore therein,
      (2) a brake member axially secured to said cylinder in said cavity, said brake member being formed with a recess axially open toward said other compartment and dimensioned for receiving a portion of said plunger member in said one terminal position of said piston,
      (3) impeding means on said brake member impeding axial movement of said plunger member when received in said recess, said brake member and said cylinder bounding a throttling conduit therebetween permanently communicating with said other compartment,
      (4) first one-way valve means on said plunger member permitting fluid flow from said recess through said bore into said other compartment while impeding fluid flow from said other compartment into said bore in said one terminal position of said piston, and
      (5) second one-way valve means operatively interposed between said recess and said throttling conduit for permitting fluid flow from said other compartment into said recess through said throttling conduit while impeding fluid flow from said recess into said other compartment in said one terminal position of said piston.

2. A gas spring as set forth in claim 1, wherein one of said valve means is spring-loaded to permit fluid flow only in response to a predetermined fluid pressure differential.

3. A gas spring as set forth in claim 2, wherein said one valve means is said second valve means.

4. A gas spring as set forth in claim 1, wherein said brake member axially separates a portion of said throttling conduit from said compartment, said second one-way valve means communicating with said portion of the throttling conduit.

5. A gas spring as set forth in claim 1, wherein said plunger member is formed with a passage having respective orifices in said bore and in said other compartment in said one terminal position of said piston, said first one-way valve means including a yieldably resilient valve member covering the orifice of said passage in said other compartment.

6. A gas spring as set forth in claim 1, wherein said fluid includes an amount of liquid sufficient to fill said recess in said one terminal position of said piston.

7. A spring as set forth in claim 1, wherein said impeding means include a portion of said brake member bounding said recess, said portion being resiliently compressible, and the cross section of said recess being smaller than the corresponding cross section of said plunger member when said portion is in the relaxed condition.

* * * * *